United States Patent
Chaney

(10) Patent No.: US 10,667,565 B2
(45) Date of Patent: Jun. 2, 2020

(54) WADER SOCK

(71) Applicant: Brian Chaney, Portland, OR (US)

(72) Inventor: Brian Chaney, Portland, OR (US)

(*) Notice: Subject to any disclaimer, the term of this patent is extended or adjusted under 35 U.S.C. 154(b) by 101 days.

(21) Appl. No.: 16/013,712

(22) Filed: Jun. 20, 2018

(65) Prior Publication Data

US 2019/0387812 A1 Dec. 26, 2019

(51) Int. Cl.
*A41B 11/00* (2006.01)
*A41B 11/12* (2006.01)

(52) U.S. Cl.
CPC .......... *A41B 11/007* (2013.01); *A41B 11/12* (2013.01); *A41B 2400/60* (2013.01)

(58) Field of Classification Search
CPC ..... A41B 11/12; A41B 17/00; A41B 2400/60; A41B 11/005; A41B 11/01; A41B 11/10; A41B 11/007; A41F 11/00
USPC ............................................................ 2/239
See application file for complete search history.

(56) References Cited

U.S. PATENT DOCUMENTS

| | | | | |
|---|---|---|---|---|
| 1,597,934 A * | 8/1926 | Stimpson | A41B 11/007 36/3 A |
| 4,373,361 A * | 2/1983 | Thorneburg | A41B 11/02 2/241 |
| 4,649,656 A * | 3/1987 | Cox | A43B 5/08 36/114 |
| 4,809,447 A * | 3/1989 | Pacanowsky | A41B 11/005 2/239 |
| 4,832,010 A * | 5/1989 | Lerman | A61F 2/7812 602/63 |
| 4,967,494 A * | 11/1990 | Johnson | A41B 11/005 2/239 |
| 5,020,164 A * | 6/1991 | Edwards | A41B 11/00 2/239 |
| 5,325,541 A * | 7/1994 | Willard | A41B 11/005 2/239 |
| 5,335,517 A * | 8/1994 | Throneburg | A41B 11/00 2/239 |
| 5,402,540 A * | 4/1995 | Williams | A41B 11/005 12/142 G |
| 5,430,896 A * | 7/1995 | Bisley | A41B 11/005 2/239 |
| 5,450,630 A * | 9/1995 | Hale | A41B 11/00 2/239 |
| 5,483,704 A * | 1/1996 | Filipiak | A41F 13/00 2/239 |
| 5,655,226 A * | 8/1997 | Williams | A41B 11/005 2/239 |
| 5,682,616 A * | 11/1997 | Pisano | A41B 11/00 2/16 |
| 5,740,559 A * | 4/1998 | Thiel | A41B 11/00 2/239 |

(Continued)

*Primary Examiner* — Alissa L Hoey
(74) *Attorney, Agent, or Firm* — Mark S Hubert

(57) ABSTRACT

A wader sock for use beneath a pair of waterproof boots or in a pair of hip or chest waders as would be used by an outdoorsman or fisherman. The socks are water resistant and have a neoprene construction sandwiched between two sheer layers of polymer fabric. The sock has several panels of conventional neoprene and a single panel of perforated neoprene spanning under the sole and behind calf panel that allows for the ejection of water when the wearer walks. There is a unitary piece foldable upper cuff with a top hook for connection to the waders.

6 Claims, 10 Drawing Sheets

(56) References Cited

U.S. PATENT DOCUMENTS

| | | | | |
|---|---|---|---|---|
| 5,784,721 | A * | 7/1998 | Huff | A41B 11/02 2/239 |
| 5,913,592 | A * | 6/1999 | Moore | A43B 7/26 36/4 |
| 6,286,151 | B1 * | 9/2001 | Lambertz | A41B 11/003 2/239 |
| 6,381,756 | B1 * | 5/2002 | Smith | A41B 11/00 2/242 |
| 6,446,360 | B1 * | 9/2002 | Sheets | A43B 23/022 36/55 |
| 7,055,267 | B2 * | 6/2006 | Wilson | A43B 7/08 36/10 |
| 7,076,973 | B1 * | 7/2006 | Chesebro, Jr. | A41B 11/00 2/239 |
| 7,219,443 | B2 * | 5/2007 | Czaplewski | A41D 17/00 36/2 R |
| 7,730,555 | B2 * | 6/2010 | Hexels | A41B 11/005 2/239 |
| 7,891,116 | B1 * | 2/2011 | Iglikov | A43B 23/0205 36/4 |
| 9,981,448 | B2 * | 5/2018 | Gallagher | B29C 66/72941 |
| 10,362,811 | B2 * | 7/2019 | Baravarian | A41B 11/02 |
| 10,398,584 | B2 * | 9/2019 | Iida | A61F 13/066 |
| 2002/0017358 | A1 * | 2/2002 | Williams | A41B 11/00 156/156 |
| 2002/0029405 | A1 * | 3/2002 | Outwater | A41B 11/00 2/239 |
| 2002/0088254 | A1 * | 7/2002 | Singleton | A41B 11/00 66/177 |
| 2002/0170653 | A1 * | 11/2002 | Cole | A41B 11/00 156/156 |
| 2007/0163145 | A1 * | 7/2007 | Lavers | A41B 11/005 36/4 |
| 2009/0083996 | A1 * | 4/2009 | Clancy | A43B 5/08 36/88 |
| 2011/0265233 | A1 * | 11/2011 | Shiue | A41D 13/012 2/2.15 |
| 2012/0198601 | A1 * | 8/2012 | Shinga | A41B 11/005 2/239 |
| 2012/0266363 | A1 * | 10/2012 | Kinuthia | A41B 11/06 2/239 |
| 2013/0302558 | A1 * | 11/2013 | Schoenbeck | A41B 11/002 428/99 |
| 2014/0345032 | A1 * | 11/2014 | Sheu | A43B 17/003 2/239 |
| 2015/0327606 | A1 * | 11/2015 | Pinto Rodrigues | A41D 17/00 2/239 |
| 2016/0095381 | A1 * | 4/2016 | Xu | A41B 11/005 2/239 |
| 2016/0120232 | A1 * | 5/2016 | Raeuber | A41B 11/00 2/239 |
| 2016/0242471 | A1 * | 8/2016 | Marville | A41B 11/003 |
| 2016/0302491 | A1 * | 10/2016 | Campbell | A41B 11/003 |
| 2019/0082746 | A1 * | 3/2019 | Storelli | A41B 11/008 |

\* cited by examiner

WADER SOCK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to sporting attire, and more particularly to socks to be warn in conjunction with waders or tall waterproof boots.

BACKGROUND

Fishermen utilize waders of the chest or hip design when fishing in shallow water. These are generally a contiguous, thin, waterproof, polymer set of leggings. Generally, the wearer inserts his socked feet and clothed legs into the waders. Since the fisherman is often in the water in waders for hours, there is a need to insulate the fisherman's legs and feet from the large heat loss through the waders to the body of water. Also there is often water introduced into the wader socks' top openings. Elimination of this uncomfortable element is desirable. Additionally, the bottom of the lake or river bed may have jagged rocks that put pressure points on the soles of the wearer. Padding is desirable. Sock creep is a phenomenon that occurs when the sock and the foot are not well mated by design. As the wearer walks, the sock slides down the leg toward the end of the foot where it bunches up and makes walking uncomfortable. Lastly, people's feet differ greatly in size and shape. Since waders are a niche, it is desirable to have a sock that fits a range of feet sizes and shapes.

Henceforth, an improved undergarment for use with a pair of waders that maximizes the amount of heat retained, is easy to insert into waders, fits a plethora of feet sizes and shapes, cushions the sole, and eliminates creep would fulfill a long felt need in the fishing industry. This new invention utilizes and combines known and new technologies in a unique and novel configuration to overcome the aforementioned problems and accomplish this.

BRIEF SUMMARY

In accordance with various embodiments, a wader sock is provided.

In one aspect, a rollable polymer sock having anti-creep device affixed to the outer face thereof.

In another aspect, a wader sock is provided, capable of elimination or ejecting water that has entered the sock from the top.

In yet another aspect, a wader sock made of an elastically deformable, compressible, waterproof polymer with a degree of thermal insulation and cushioning is provided.

In yet another aspect, a wader sock with a smooth outer face having a low coefficient for friction for ease of insertion into a pair of waders or boots.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
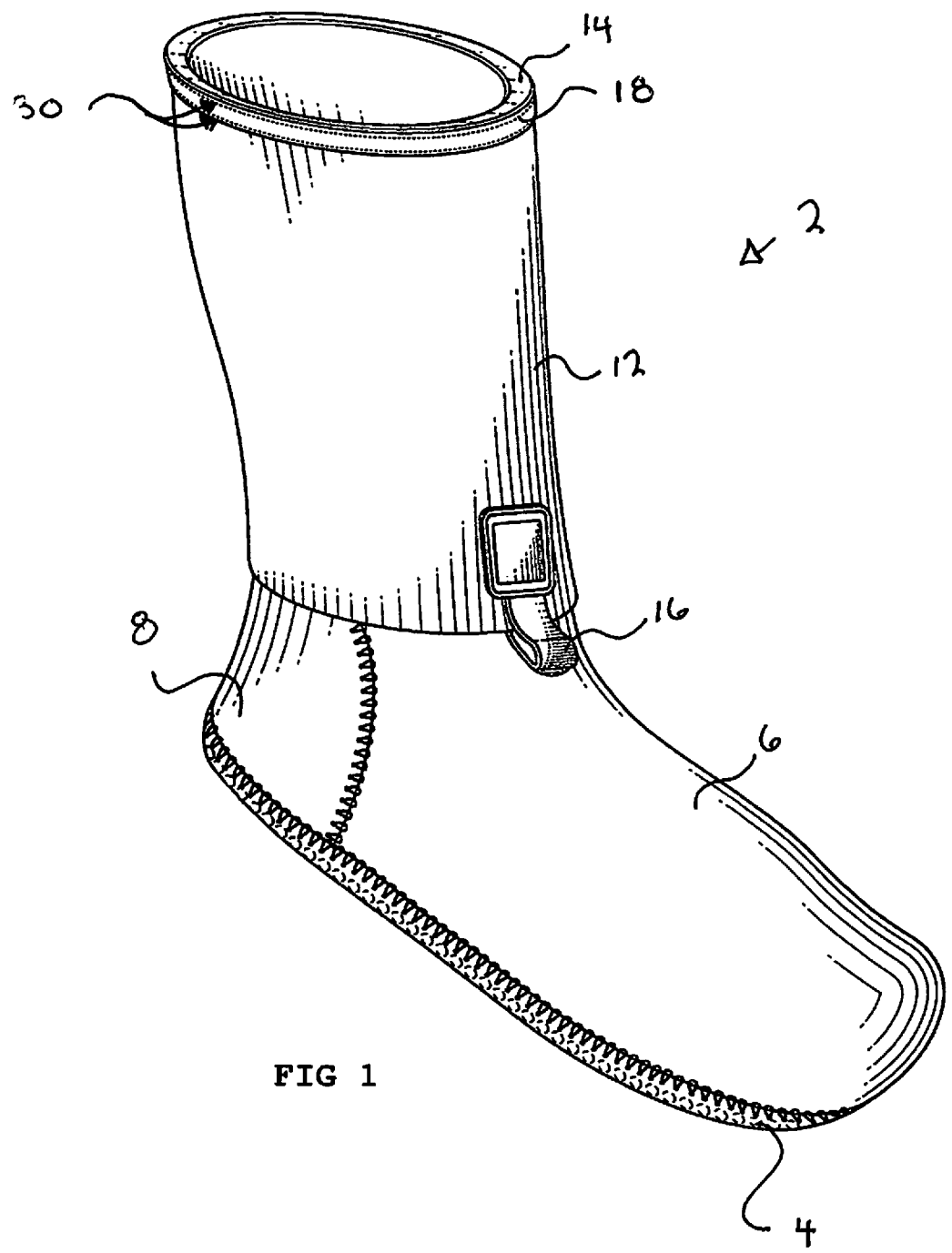
FIG. 1 is a top perspective view of the rolled wader sock.
Figure 2:
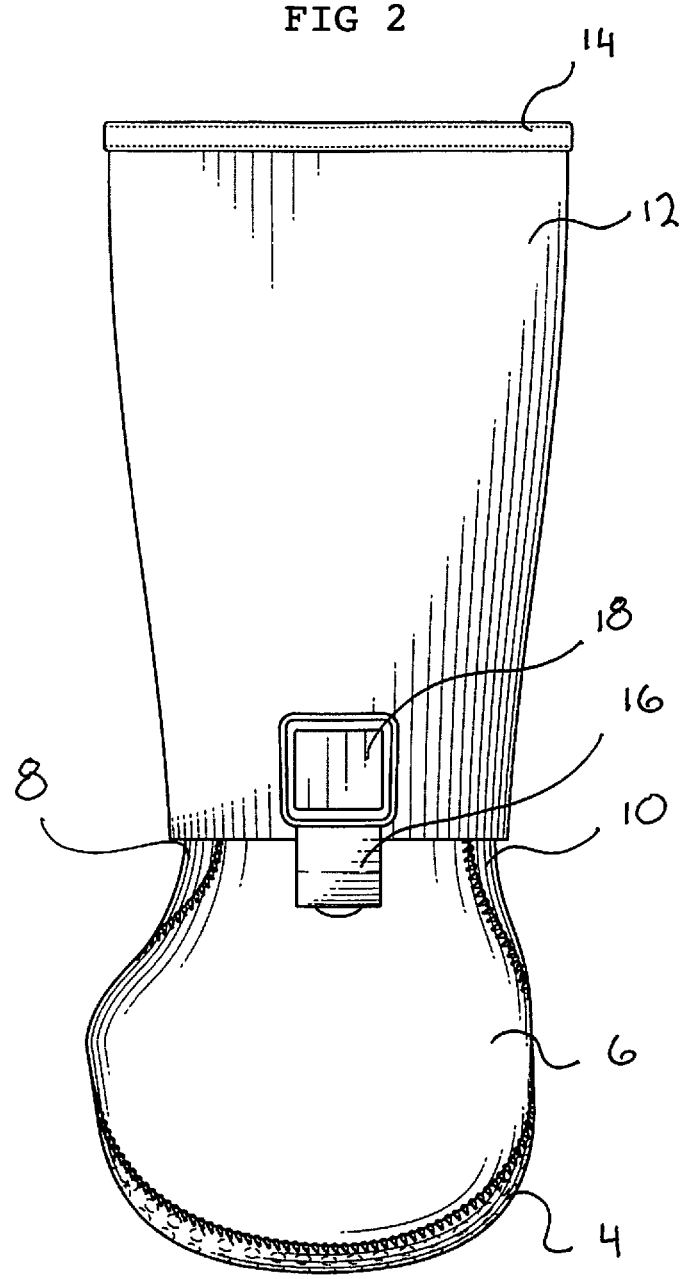
FIG. 2 is a front view of the rolled wader sock.
Figure 3:
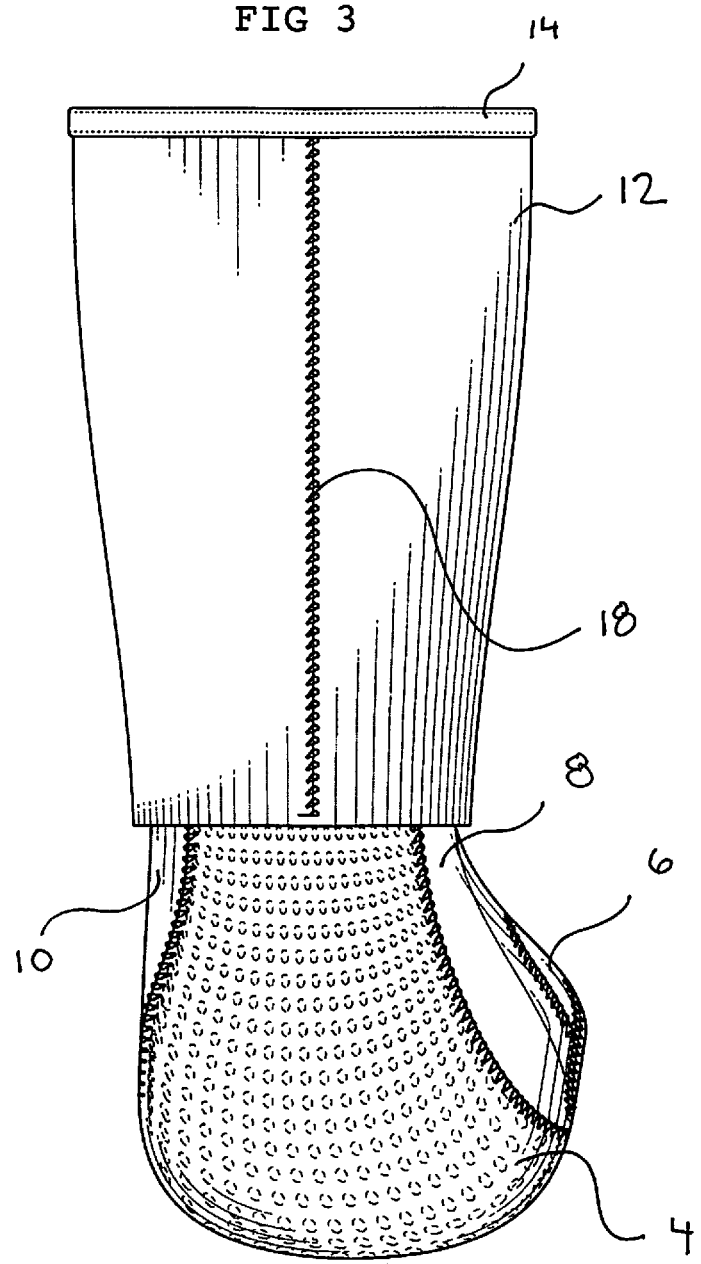
FIG. 3 is a rear view of the rolled wader sock.
Figure 4:
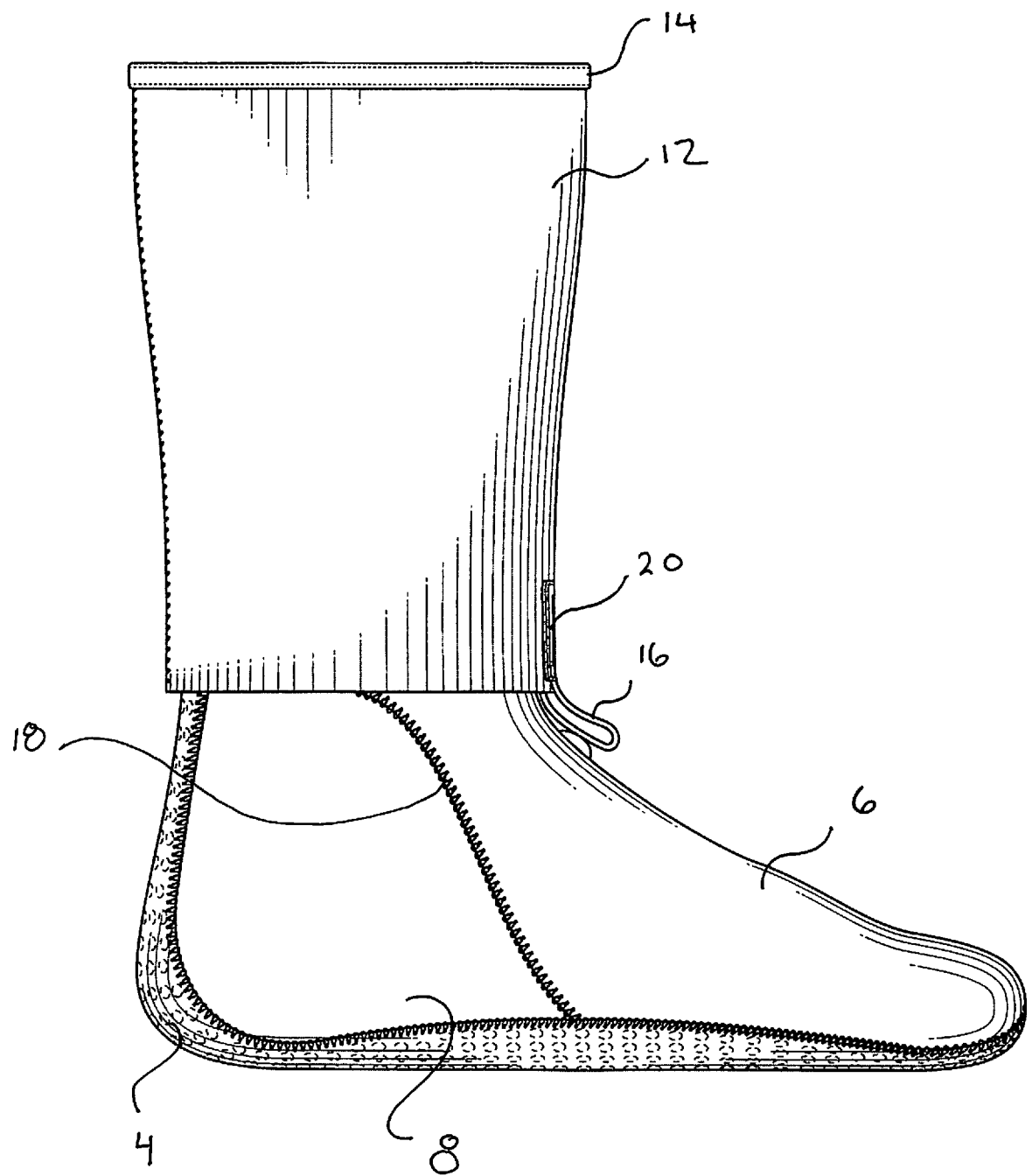
FIG. 4 is a right side view of the rolled wader sock.
Figure 5:
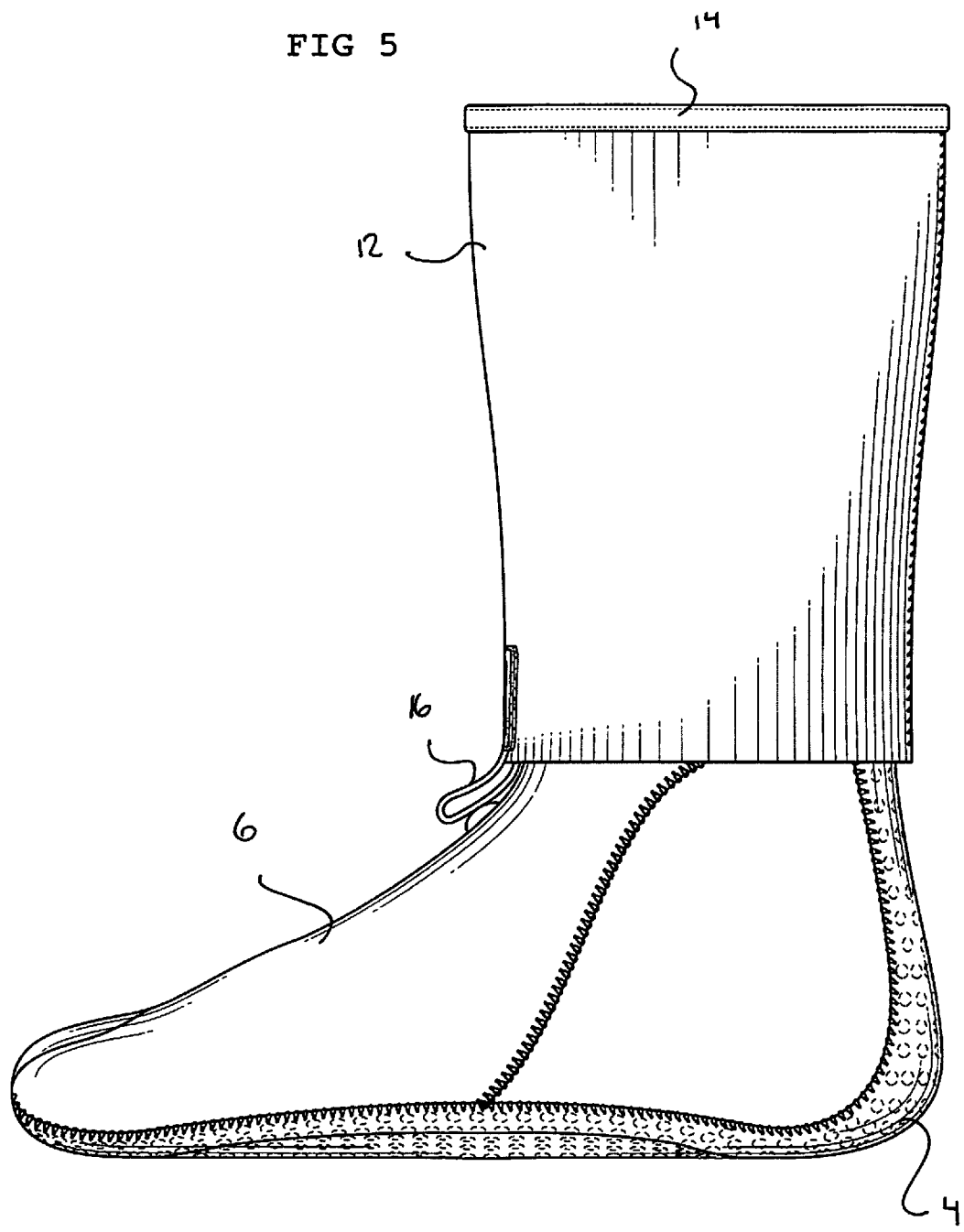
FIG. 5 is a left side view of the rolled wader sock.
Figure 6:
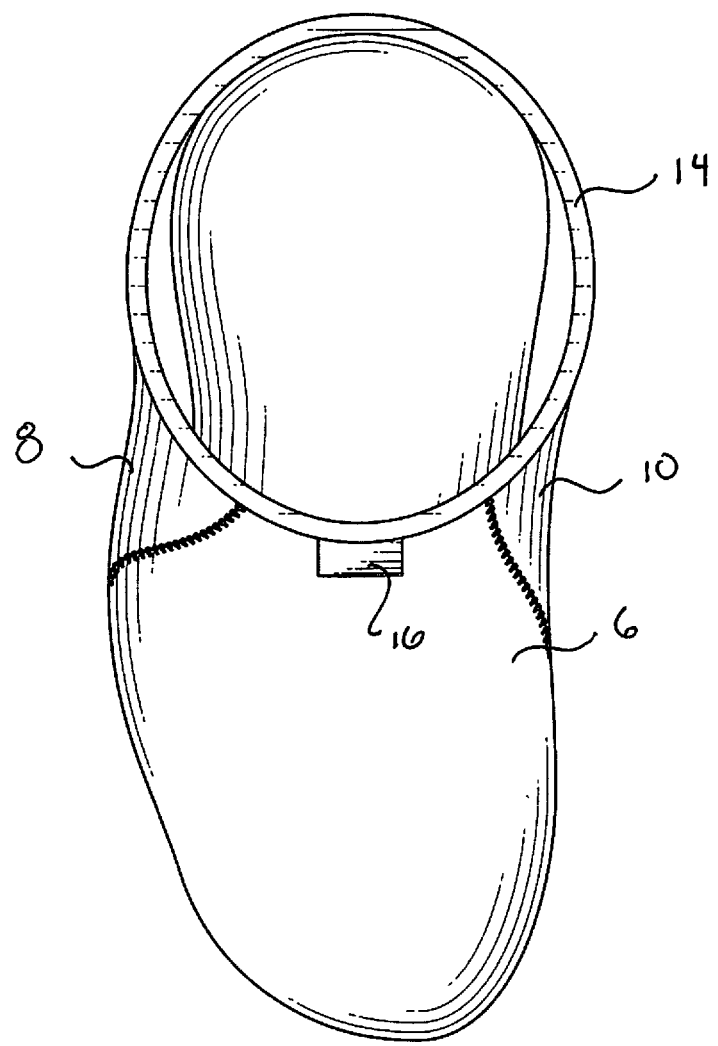
FIG. 6 is a top view of the rolled wader sock.
Figure 7:
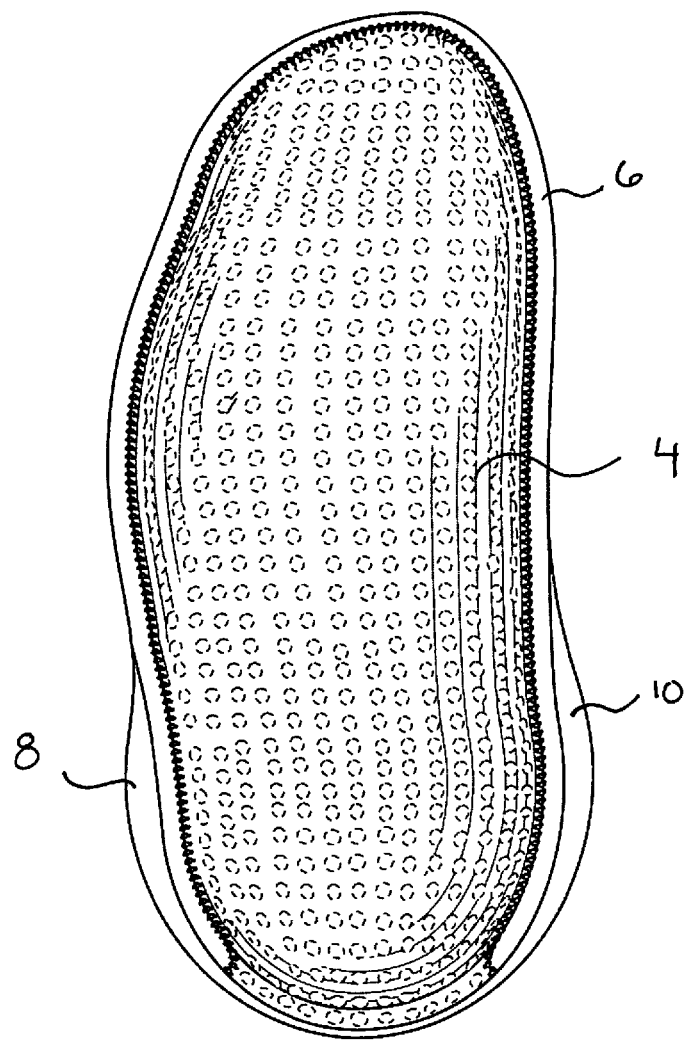
FIG. 7 is a bottom view of the rolled wader sock.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "waterproof" is equivalent with "water resistant" with respect to the fabric of construction. Technically, neoprene is not 100% impervious to water and water can penetrate through neoprene to a very small degree, however for the function of this material in a chest or hip wader, the differences are irrelevant.

The present invention relates to a novel design for a pair of socks to be used in conjunction with hip or chest waders as would be used by a fisherman. Their design adds to the comfort of the wearer by providing four elements that heretofore have not been incorporated into wader socks. They are: cushioning for comfort, porous water ejection ports on the sole and up the back of the calf to eliminate water that has entered the sock, a thermal barrier to keep the feet and legs warm and a top hook to prevent the wader sock from creeping down into the waders.

The fabric used in the construction of the wader sock 2 is commonly and commercially known as Neoprene or polychloroprene. It was invented by DuPont® in 1930, and represents a family of synthetic rubbers that are produced by polymerization of chlorine so as to encapsulate millions of tiny gas bubbles in the material. This provides a for a thickened, waterproof material that is elastically deformable in compression, that resists the transfer of heat through it, that exhibits good chemical stability and maintains flexibility over a wide temperature range. Because neoprene abrades, chips and tears easily, there is usually an associated sheer outer covering of a thin woven polymer fabric that is glued onto both sides of the underlying neoprene. This fabric must have a denier or pressure resistance rating that will allow water to pass through it when under the pressure of a human foot walking in a boot. This is a range of approximate 50 to 150 denier and a 250 to 1250 mm pressure resistance.

This fabric was chosen because it is flexible enough to be stretched over the foot and leg to return to a form fitting configuration on the wearer. This tight form fit keeps water out of the wader sock, which is crucial to the user's comfort. Not only does water in the wader sock 2 take away body heat, it makes walking about a "sloshing mess".

Looking at FIGS. 1-7 it can be seen that the wader sock 2 has eight components: a sole and heel cup panel 4, a top panel 6, a left side panel 8, a right side panel 10, an upper cuff 12 an interior fold ring 14, an upper attachment clip and a polymer (100% nylon or polyester) stitching thread 18.

There are four different types of fabric used in the wader sock 2. The top panel 6, left side panel 8, right side panel 10 and upper cuff 12 are all made from a minimum 3 mm thick neoprene fabric having a sheer polymer fabric adhesively affixed to the two outer faces of the central neoprene 12 layer. This polymer fabric outer layer in the preferred embodiment is polyester or nylon optionally with spandex or elastine mixed in to increase flexibility and 2 way stretch. In an alternate embodiment, the fabric outer layers may be what is known generally as "scuba fabric" which is a spun polyester with spandex or lycra knitted simultaneously together in what is known as a double knit.

The sole and heel cup panel 4 are made from the same materials as the remainder of the panels except the sole and heel cup panel has a repeating pattern of orifices formed through the central neoprene layer of the fabric, but not through the outer sheer fabric layers. The denier of the sheer fabric layers is large enough to allow the passage of water there through this perforated neoprene when under a slight pressure. (As is encountered with the pumping action of the foot when walking.)

The interior fold ring 14 is made of an elastic polymer strip that generally has one way elongation under tension. Lastly, the upper attachment clip is a resilient hook 16 (preferably made of metal or a rigid polymer) sewn onto a rectangular section of nylon webbing 20 affixed to or adjacent the top edge of the upper cuff 12.

The wader sock 2 has a lower sock 24 and an upper sock 26 joined at the interior fold ring 14 so as to form a horizontal interface between these two sock portions. The sole and heel cup panel 4, top panel 6, left side panel 8 and right side panel 10 form the lower sock 24 and are shaped such that when connected, will form the contour of a lower portion of a human leg and foot. The upper sock 26 has a tubular configuration. Looking at FIG it can be seen that the sole and heel cup panel 4, is a linear strip extending from the tip of the wader sock 22 to the interface of the upper cuff 12 at the interior fold ring 14. It thus places the most compressible neoprene along the bottom of the foot and up the calf. These are the two areas that the leg and foot contact the wader sock 2 with the most pressure as the wearer moves about. Since these are the porous perforated neoprene sections, downward pressure generated between the arch of the foot and the bottom of the waders pump the water out of the sock. The outer sheer fabric bonded to the neoprene has a fine denier that resists water not under pressure from returning into the sock. In this manner, the user's feet are kept isolated from water that has entered the wader sock 2. A low friction coating may optionally be applied to the outer face of the wader sock 2 to ease the forces of insertion into tight waders or boots.

Figure 10:
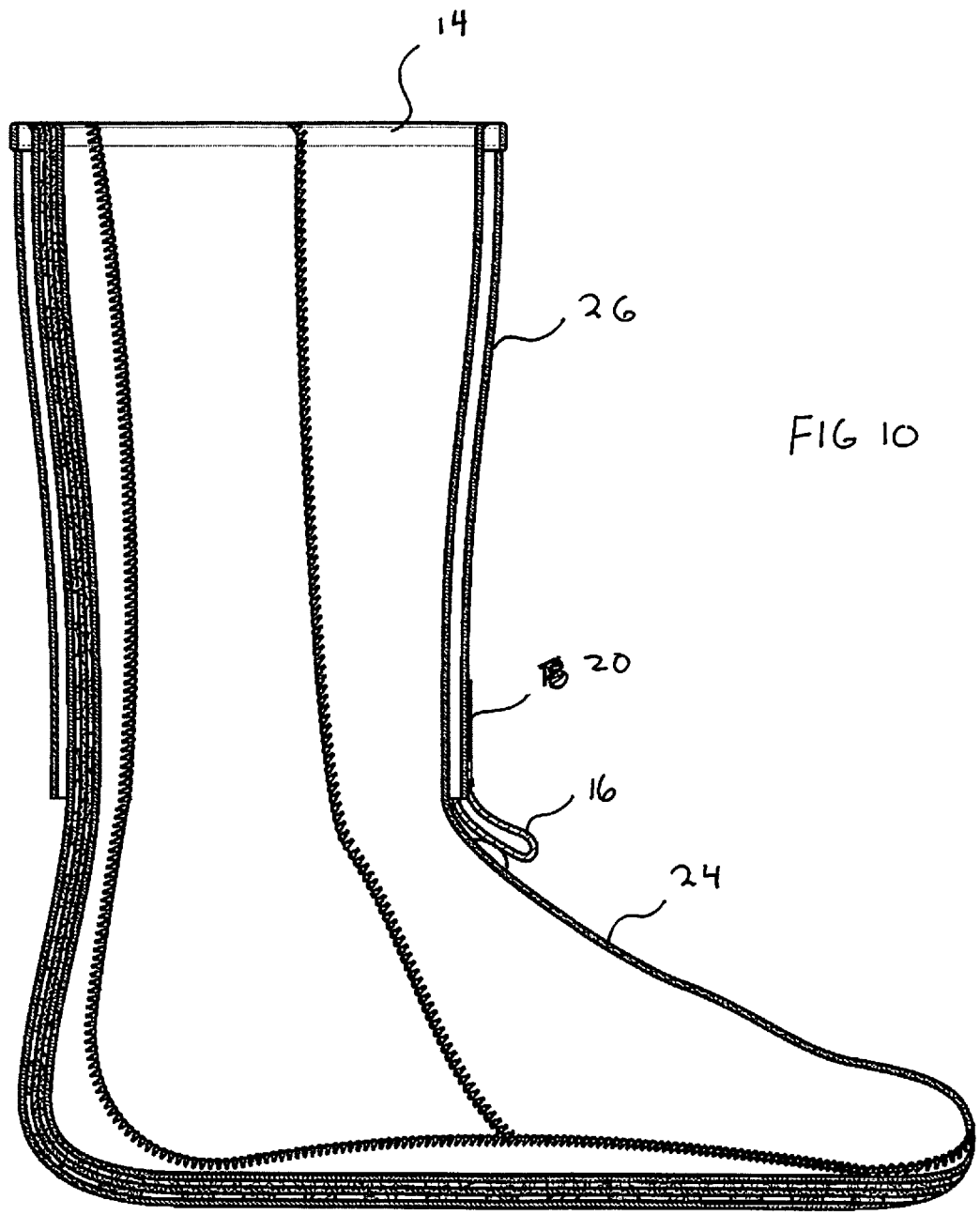
FIG. 10 side cross sectional view of the rolled wader sock.

The sole and heel cup panel 4 and the top panel 6 are the longest panels extending from the wader sock front tip 22 to the upper cuff 12. The leading edges of these panels from the toe area to mid foot 35, are joined together, preferably by flat lock or blind stitching method of sewing engagement. Disposed between these panels beginning at mid foot 35 where the sole and heel cup panel 4 and the top panel 6 diverge and continue to the upper cuff 12, are the intermediary, shorter, mirror image, L shaped left side and right side panels 8 and 10. These are also joined to the sole and heel cup panel 4 and the top panel 6, preferably by a flat lock or blind stitching method of sewing engagement. The top edge of these joined four panels form a ring that is joined to a similarly sized ring on the upper cuff 12, by the interior fold ring 14. The interior fold ring 14 spans the circular edge of the lower end of the upper sock 26 and the similarly sized circular edge of the top end of the lower sock 24, extending down for a short distance onto their interior faces adjacent their edges. The interior fold ring 14 thus connects the bottom perimeter of the upper cuff 12 and the top perimeter of the joined sole and heel cup panel 4, top panel 6, left side panel 8 and right side panel 10. (This is best seen in FIGS. 1 and 10.) Stated differently, the lower sock 24 and upper sock 26 are connected together by the upper fold ring 14 that spans over both of their edges and down onto their inner faces. The interior fold ring 14 acts as a natural fold line for the upper cuff. It also, more importantly, serves to make watertight and protect this interface edge when the wader sock 2 is in its folded configuration.

The method of joining the panels, upper cuff and ring makes a difference in how well they perform, especially with respect to waterproofing. In the preferred embodiment, the sole and heel cup panel 4, top panel 6, left side panel 8, and right side panel 10 are connected with a flat lock stitch wherein the edges of the neoprene are butted or overlapped together, and two or four needles punch all the way through the material to make a flat, interlocking thread pattern that is very strong and comfortable against the skin. The many holes created do allow considerable water penetration. This may be waterproofed by using an adhesive waterproof fabric tape that is glued or hot meted onto the fabric or through the application of a liquid seam sealant as is well known in the industry. The two edges of the upper cuff 12 (FIG. 3) are also joined in this manner.

Alternately, the panels may be joined with a blind stitch where the edges of the material are first glued together then the seam stitched together with an overlapping stitch from a special sewing machine with a curved needle. Here the needle only penetrates the face fabric on one side of the material. This very strong seam that is waterproof but requires a minimum of a 3 mm thick neoprene.

There is a different type of stitching used to connect the lower sock 24 and the upper sock 26. The upper fold ring 14 uses a single needle stitched pattern 30 of stitching thread 18 formed in two rings about the peripheral edges of the lower sock 24 and upper sock 26 so as to form a contiguous wader sock 2. Because of the elevation that this stitching occurs water intrusion through any needle holes is not an issue. The upper sock 26 primarily is only for insulation and splash protection and is never immersed in water as the sole of the lower sock 24 may be.

Figure 8:
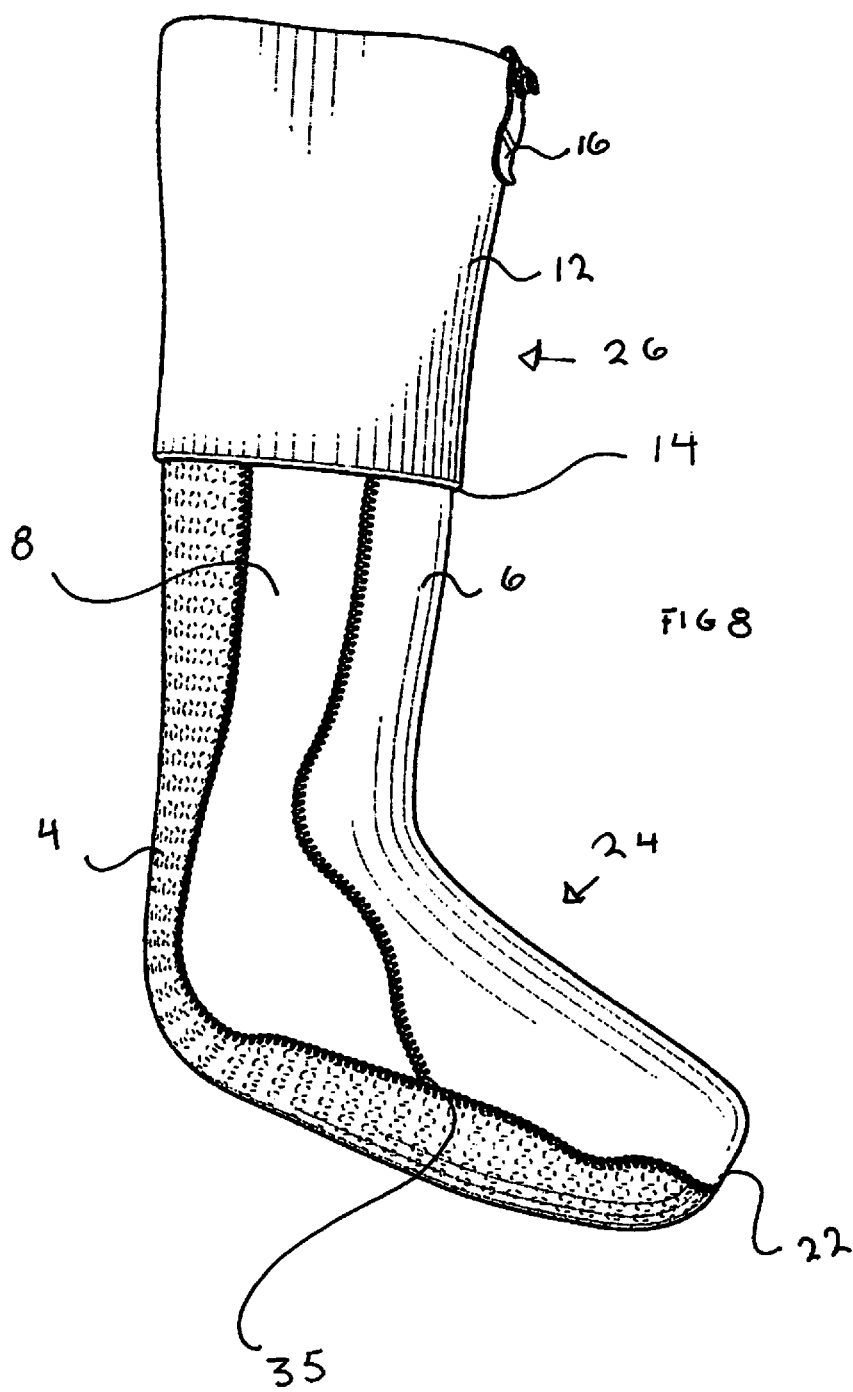
FIG. 8 is right side view of the unrolled wader sock.
Figure 9:
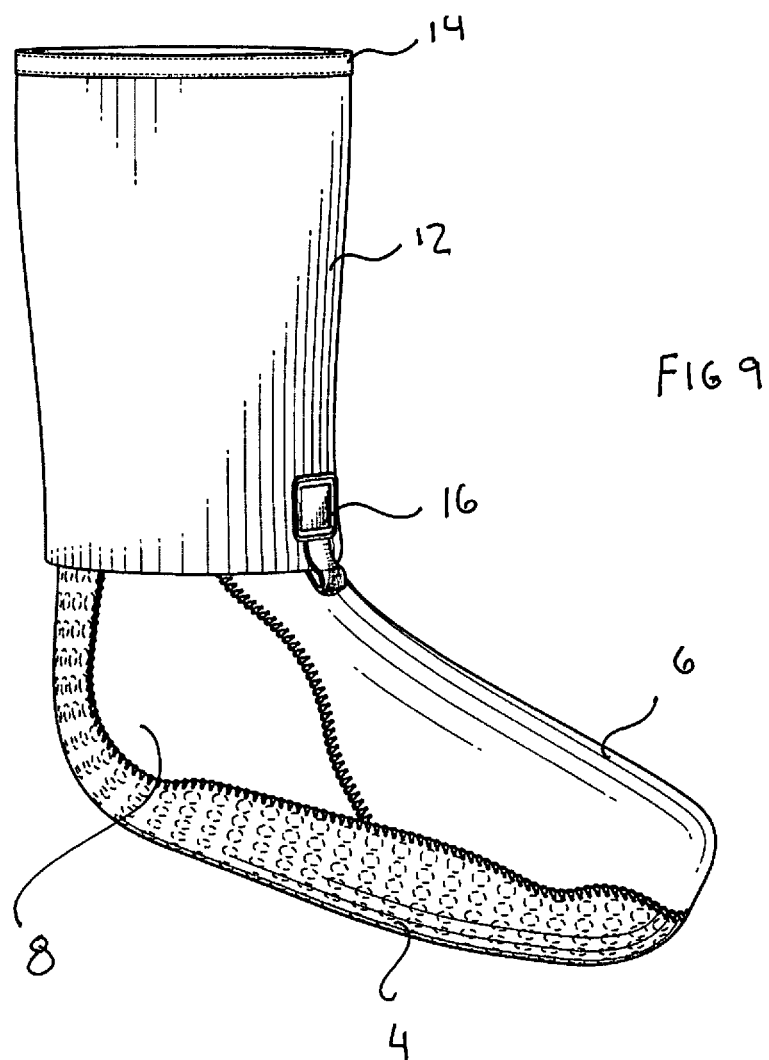
FIG. 9 is a right side view of the rolled wader sock.

In use, the wader sock 2 may be worn full stretched as in FIG. 8 or folded as in FIG. 1. When in its fully stretched configuration, the wader sock's upper attachment clip may be hooked onto a ring adjacent or on the top of the waders. This will eliminate the tendency of socks to creep down and off the legs and feet when in tight contact with an exterior moving surface (such as a high boot). Optionally, other users may wish to use the wader sock 2 with a lower type of boot and then will fold the wader sock 2 at its natural break point, the interior fold ring 14.

When a conventional wader sock is installed in a pair of chest or hip waders and water enters the sock, the wearer is stuck with that sloshing mess in his sock until he empties the sick. With this improved wader sock 2, as the user moves around this water is simultaneously pumped out of the wader sock 2 in the sole, the heel cup and the calf regions by the walking pressure the foot places on the porous neoprene. Hence the reason for the linear sole and heel cup panel that extends from the wader sock front tip 22 of the wader sock 2 to the upper fold ring 14. (FIGS. 3 and 8) This feature along with the extra cushioning of the porous neoprene and the insulating properties of the thick neoprene provide the user a level of comfort not seen yet in the industry. Water that enters the waders is unable to penetrate the remaining panels on the lower sock 24. The tight fit of the neoprene as well as the selection of an outer sheer fabric bonded to the neoprene with a weave tightness having a porosity that resists water entry not under pressure, prevents the water ejected from the wader sock 2 into the waders from reentering the wader sock 2.

While certain features and aspects have been described with respect to exemplary embodiments, one skilled in the art will recognize that numerous modifications are possible. Consequently, although an exemplary embodiment is described above, it will be appreciated that the invention is intended to cover all modifications and equivalents within the scope of the following claims.

Having thus described the invention, what is claimed as new and desired to be secured by Letters Patent is as follows:

1. A water resistant wader sock for use in waterproof boots, waders or legwear comprising:
   an upper sock comprised of a tubular upper cuff with an upper attachment clip affixed on or adjacent to a top edge of said upper cuff;
   a lower sock with a sole and heel cup panel made of neoprene with a polymer fabric adhesively affixed to an inner face and an outer face thereof, said neoprene perforated with orifices large enough to allow the passage of water, and wherein said polymer fabric allows the passage of water only when under pressure;
   an interior fold ring; and
   polymer stitching thread;
   wherein said interior fold ring connects said upper sock to said lower sock by sewing with said stitching thread; and
   wherein said lower sock is made of said sole and heel cup panel, a top panel, a left side panel, a right side panel, and said polymer stitching thread;
   wherein said sole and heel cup panel and said top panel extend from a front tip of said wader sock to said interior fold ring and are sewn together with said polymer stitching thread from said front tip to a mid foot area where they separate and are no longer directly connected; and
   wherein sewn between said sole and heel cup panel and said top panel beginning at said mid foot area where said sole and heel cup panel and said top panel separate, and continuing to said upper cuff, are said left side panel and said right side panel; and
   wherein a top edge of said sole and heel cup panel, said top panel, said left side panel and said right side panel, form a first ring.

2. The water resistant wader sock of claim 1, wherein said perforated neoprene is a minimum 3 mm thick central layer and said polymer fabric is a sheer polymer fabric.

3. The water resistant wader sock of claim 1 wherein a bottom edge of said upper cuff forms a second ring.

4. The water resistant wader sock of claim 3 wherein said interior fold ring has a first edge and a second edge and spans between said top edge of said first ring and said bottom edge of said second ring, and said first edge extends onto an interior face of said lower sock and said second edge extends onto an interior edge of said upper sock, and
   wherein said interior fold ring is sewn to said lower sock and to said upper sock with said polymer stitching thread.

5. The water resistant wader sock of claim 4 wherein said top panel, said left side panel, said right side panel and said upper cuff are all made from a minimum 3 mm thick central layer of neoprene having a sheer polymer fabric adhesively affixed to an inner face and an outer face thereof.

6. The water resistant wader sock of claim 5 wherein said polymer fabric outer layer is at least one member selected from the group of polymer fabrics consisting of polyester, nylon, polyester with spandex, polyester with elastine, nylon with spandex and nylon with elastine, spun polyester with spandex double knit, and spun polyester with lycra double knit.

\* \* \* \* \*